Dec. 3, 1963    A. G. LAUTZENHISER    3,112,962
MAGNETIC SUSPENSION SYSTEM
Filed Jan. 17, 1962
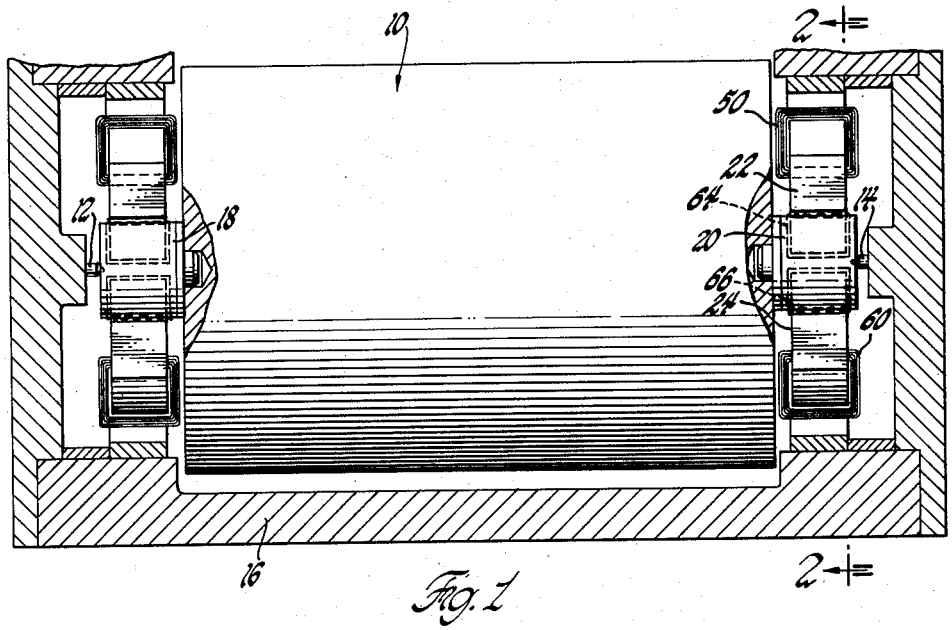
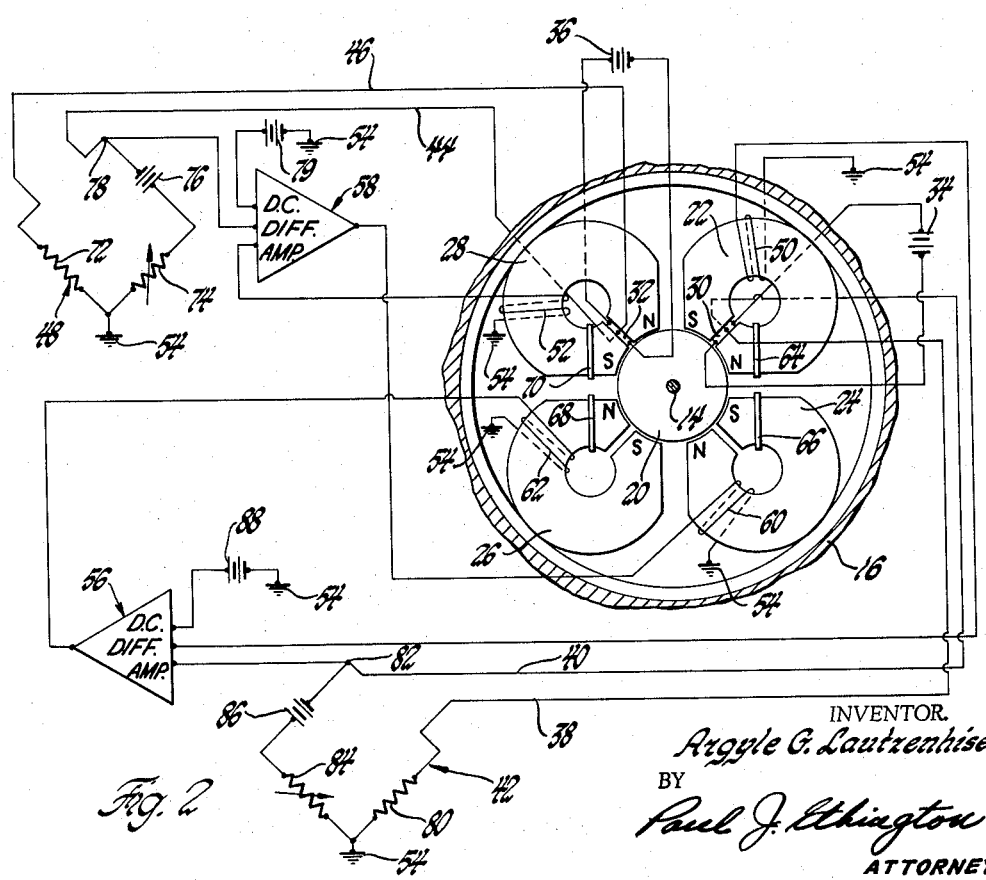
INVENTOR.
Argyle G. Lautzenhiser
BY
Paul J. Ethington
ATTORNEY United States Patent Office  3,112,962
Patented Dec. 3, 1963

3,112,962
MAGNETIC SUSPENSION SYSTEM
Argyle G. Lautzenhiser, Essex, Mass., assignor to General Motors Corporation, Detroit, Mich., a corporation of Delaware
Filed Jan. 17, 1962, Ser. No. 166,866
5 Claims. (Cl. 308—10)

This invention relates to magnetic suspension apparatus for magnetically suspending a ferromagnetic body and more particularly an improvement thereof whereby control means including Hall effect sensing devices are utilized for maintaining the body in a predetermined position with respect to the magnetic suspension apparatus.

It is frequently desirable in systems utilized for magnetically suspending a ferromagnetic body with respect to magnetic force producing means to provide control means responsive to displacements of the body for developing signals which may be used to vary the magnetic forces acting on the body and hence restore the body to its original position. Since a displacement of the suspended body with respect to one of the magnetic force producing means causes a change in the flux density in the air gap therebetween one method of sensing such displacements would be to utilize means responsive to variations in flux density. However, since the magnetic forces tending to suspend the body decrease in proportion to the air gap length, it is desirable that such magnetic flux density responsive means be placed other than in the air gap between the suspended body and the magnetic force producing means. Furthermore, it may be desirable to use magnetic flux density responsive means other than that of the coil variety since the magnetic field linking the coils may create unwanted reaction torques acting on the suspended body.

In accordance with this invention, a magnetic suspension apparatus for suspending a ferromagnetic body is provided having control means for maintaining the body in a predetermined position with respect to the magnetic suspension apparatus and including a displacement sensor of the magnetic flux density responsive variety which does not create unwanted reaction torques acting on the suspended body and which is not required to be placed in the air gap between the magnetic force producing means and the suspended body. This is accomplished by magnetically suspending a ferromagnetic body between at least two magnetic force producing means one of which has a magnetic flux leakage gap. By providing a Hall effect device in the leakage gap, an output voltage may be obtained which is proportional to the magnitude of the magnetic flux traversing the leakage gap and which voltage is thus proportional to the displacement of the body with respect to magnetic force producing means. The voltage may be applied to control means for providing a control signal to circuit means on one of the magnetic force producing means to control the magnetic forces produced thereby so as to obtain a net magnetic force acting on the body to return the body to its original position. The suspension apparatus may be further stabilized by utilizing means responsive to the rate of change of displacement of the suspended body relative to the magnetic force producing means and operative to develop a stabilizing signal of a polarity and magnitude as determined by the direction and magnitude, respectively, of the displacement of the suspended body and apply the signal to the control means to increase the magnitude of the control signal. Damping means may be used for minimizing oscillations of the suspended body due to any abrupt changes in magnetic flux density in the magnetic force producing means.

A more complete understanding of the invention may be had from the detailed description which follows taken in conjunction with the drawings in which:

FIGURE 1 is a plan view partly in section of one application of the embodiment of the invention shown in FIGURE 2.

FIGURE 2 is a diagrammatic representation of one embodiment of the invention.

Referring now to FIGURE 1, there is shown an illustrative application of the embodiment of the invention shown in FIGURE 2. A cylindrical body 10 which may take the form of a gyro float having two coaxially disposed ferromagnetic cylindrical rotors 18 and 20 respectively mounted on each end is axially suspended between two coaxially disposed pivots 12 and 14 suitably secured to a supporting frame 16. The rotors 18 and 20 are each magnetically suspended radially of its axis of symmetry with the magnetic suspension apparatus of the embodiment of the invention shown in FIGURE 2.

In FIGURE 2 there is shown a ferromagnetic cylindrical rotor 20 magnetically suspended radially of its axis of symmetry between four U-shaped permanent magnets 22, 24, 26 and 28 disposed in quadrature about the rotor. The pole faces of each magnet are concave in curvature providing a surface which is equidistant from the cylindrical surface of the rotor 20. A working air gap is defined by the space between the pole faces of each magnet and the cylindrical surface of the rotor 20 and a leakage air gap is defined by the space between the poles of each magnet. The magnets 22 and 28 have rectangularly shaped Hall effect devices 30 and 32, respectively, mounted in the leakage air gaps thereof. Direct voltage sources 34 and 36 are connected across a pair of oppositely disposed ends of the Hall effect devices 30 and 32, respectively, for excitation thereof. Output leads 38 and 40 are connected with a pair of opposite sides of the Hall effect device 30 constituting one arm of a bridge circuit 42 so as to obtain an output voltage in a direction which is mutually perpendicular with both the lines of magnetic flux in the leakage air gap of the permanent magnet 22 and the direction of current flow in the Hall effect device 30 due to the source 34. A pair of output leads 44 and 46 are connected across a pair of oppositely disposed sides of the Hall effect device 32 constituting one arm of a bridge circuit 48 so as to obtain an output voltage in a direction which is mutually perpendicular with both the lines of magnetic flux in the leakage air gap of the permanent magnet 28 and the direction of current flow in the Hall effect device 32 due to the source 36. In addition, the magnets 22 and 28 have wound thereon stabilization coils 50 and 52, respectively. The coil 50 is connected between ground 54 and the input of a D.C. differential amplifier 56 and the coil 52 is connected between ground 54 and the input of a D.C. differential amplifier 58. The magnets 24 and 26 have respectively wound thereon control coils 60 and 62. The coil 60 is connected between ground 54 and the output of the differential amplifier 58 and the coil 62 is connected between ground 54 and the output of the differential amplifier 56. Copper rings 64, 66, 68 and 70 are provided on one pole of each of the magnets 22, 24, 26 and 28, respectively, for damping purposes.

The bridge circuit 48 comprises four bridge arms and includes a fixed resistor 72 connected in series with the output leads 44 and 46 of the Hall effect device 32 between ground 54 and an output terminal 78. The bridge circuit 48 also includes a variable resistor 74 connected in series with a standard direct voltage source 76 between ground 54 and the output terminal 78. The output terminal 78 is connected with the input of the D.C. differential amplifier 58. A positive direct voltage bias source 79 having a value equal and opposite that existing between ground 54 and the output terminal 78 of the bridge 48, when the rotor 20 is centered with respect to the four permanent magnets 22, 24, 26 and 28, is connected with the input of the D.C. differential amplifier 58. The bridge circuit 42 comprises four bridge arms and includes a fixed resistor 80 connected in series with the output leads 38 and 40 of the Hall effect device 30 between ground 54 and an output terminal 82. The bridge 42 also includes a variable resistor 84 connected in series with a standard direct voltage source 86 between ground 54 and the output terminal 82. The output terminal 82 is connected with the input of the D.C. differential amplifier 56. A positive direct voltage bias source 88 having a value equal and opposite that existing between ground 54 and the output terminal 82 of the bridge circuit 42, when the rotor 20 is centered with respect to the four permanent magnets 22, 24, 26 and 28, is connected with the input of the D.C. differential amplifier 56.

The poles of the U-shaped permanent magnets 22, 24, 26 and 28 are polarized as shown in FIGURE 2 and hence the magnetic flux flowing in the magnetic circuit of each magnet flows as follows: from the north pole across the working air gap through the ferromagnetic rotor 20 and back across the working air gap to the south pole and through the magnetic material of the magnet from the south pole to the north pole. However, a certain amount of magnetic flux flowing in each magnetic circuit will flow across the leakage air gap of the magnet from the north pole to the south pole, the magnitude of such magnetic flux being determined by the reluctance of the working air gap which decreases with corresponding decreases in the length of the working air gap. Thus, it is seen that radial displacements of the rotor 20 with respect to the magnets 22, 24, 26 and 28 will result in variations in the lengths of the working air gaps resulting in variations in the amount of magnetic flux flowing in the leakage air gaps of the magnets.

It is well known that when current flows in a Hall effect device, such as 30 or 32, and a magnetic field is applied perpendicularly to the direction of current flow, an electric potential is generated in a direction which is perpendicular to both the direction of current flow and the magnetic field. Hence, a potential exists across the output leads 38 and 40 of the Hall effect device 30 and across the output leads 44 and 46 of the Hall effect device 32 indicative of the magnitude of magnetic flux flowing across the leakage air gaps of magnets 22 and 28, respectively.

The output voltage existing across the leads 38 and 40 of the Hall effect device 30 is applied to the bridge circuit 42 whereby the lead 40 is negative with respect to the lead 38 and the output voltage existing across the leads 44 and 46 of the Hall effect device 30 is applied to the bridge circuit 48 whereby the lead 44 is negative with respect to the lead 46. With the rotor 20 radially centered with respect to the magnets 22, 24, 26 and 28, the bridge circuits 42 and 48 are balanced with the variable resistors 84 and 74, respectively, so as to obtain negative potential existing on the output terminals 82 and 78 equal in magnitude to the potential of the positive direct voltage bias sources 88 and 79, respectively. When the rotor 20 is at rest no voltage will be induced in the stabilization coils 50 and 52, the operation of which is explained hereinafter, and hence the stabilization coils apply no input signal to the input of the differential amplifiers 56 and 58, respectively.

A displacement of the rotor 20 radially of its axis of symmetry with respect to the magnets 22, 24, 26 and 28 will result in a change in the magnetic flux flowing in the leakage air gaps of the magnets 22 and 28 and hence the voltages existing on the output terminals 82 and 78 of the bridge circuits 42 and 48, respectively, will change in value resulting in output signal voltages obtained from the D.C. differential amplifiers 56 and 58, respectively. At the same time, voltages will be induced in the stabilization coils 50 and 52 on the magnets 22 and 28, respectively, depending upon the rate of change of magnetic flux flowing in the magnets 22 and 28 and which voltages are thus proportional to the rate of change of displacement of the rotor 20 relative to the magnets 22 and 28. These voltages, which may be termed as rate signals, are applied to the input of the D.C. differential amplifiers 56 and 58 to increase the value of the output signal voltages obtained therefrom. The coils 50 and 52 are wound on the magnets 22 and 28, respectively, such that the voltages induced therein will be of positive polarity if the output voltages of the Hall effect devices have decreased and will be of negative polarity if the output voltages of the Hall effect devices have increased. The rate signal voltages are useful in the system since they anticipate displacement and relative direction thereof of the rotor whereas the output voltages obtained from the Hall effect devices indicate the degree of displacement. The output signal voltages obtained from the differential amplifiers 56 and 58 are applied to the control coils 62 and 60, respectively, wound on the magnets 26 and 24 so as to obtain current flow therein, creating magnetomotive forces which aid or decrease, depending on the direction of displacement of the rotor 20, the magnetic forces acting on the rotor 20 by the magnets 26 and 24, respectively.

The copper rings 64, 66, 68 and 70 on one pole of each of the magnets 22, 24, 26 and 28, respectively, provide damping for the magnetic suspension system shown in FIGURE 2. This is obtained since any abrupt change in magnetic flux flowing in one of the magnets causes a voltage to be induced in the copper ring thereon of a polarity so as to create a magnetic field opposing the effect of the change in magnetic flux flow. Thus in this manner the copper rings minimize oscillations of the rotor 20 due to any abrupt changes in magnetic flux flowing in the magnets.

The operation of the magnetic suspension system shown in FIGURE 2 is best illustrated with the following example. Assuming that the rotor 20 is radially displaced along an axis defined by the leakage air gaps of magnets 24 and 28 and that initially the rotor 20 is displaced toward the pole faces of the magnet 28, it is seen that the length of the working air gap between the rotor 20 and the pole faces of the magnet 28 will decrease, resulting in a decrease in the reluctance of the working air gap to the flow of magnetic flux. The magnetic flux flowing across the leakage air gap of the magnet 28 will decrease, resulting in a corresponding decrease in the voltage existing across output leads 44 and 46 of the Hall effect device 32 and hence a decrease in the voltage existing on the output terminal 78 of the bridge circuit 48. The output signal of the amplifier 58 will be positive reflecting the difference in voltage of the positive voltage source 79 and the negative voltage existing on the output terminal 78 of the bridge circuit 48. In addition, a voltage will be induced in the stabilization coil 52, reflecting the rate of change of magnetic flux flowing in the magnet 28 when the rotor 20 is radially displaced toward the pole faces of the magnet 28. This voltage is applied as a positive voltage to the input of the amplifier 58. The output signal voltage obtained from the amplifier 58 is applied to the control coil 60 wound on the permanent magnet 24 whereby the current flowing therein creates a magnetomotive force which will aid the attractive magnetic force acting on the rotor 20 due to the magnet 24 thereby restoring the rotor 20 to its original position. Similarly, if the rotor 20 is displaced toward the pole faces of the magnet 24 resulting in an increase in the length of the working air gap between the rotor 20 and the pole face of the magnet 28, the voltage existing across the terminals 44 and 46 of the Hall effect device 32 will increase due to the increase in magnetic flux flowing therethrough and hence the value of the negative voltage existing on the output terminal 78 of the bridge circuit 48 will be greater than the value of the positive voltage of the voltage source 79. In addition, the voltage induced in the coil 52 due to the rate of change of displacement of the rotor 20 with respect to the pole faces of the magnet 28 will be opposite in polarity than in the previous case described above and hence a negative potential will be applied to the input of the D.C. differential amplifier 58. The output signal voltage of the amplifier 58 will be of negative polarity and will be applied to the control coil 60 on the magnet 24 such that the magnetomotive force created by the current flowing through the coil 60 will oppose the attractive magnetic force acting on the rotor 20 due to the magnet 24 so as to decrease the pull of the magnet 24 on the rotor 20 permitting the rotor 20 to return to its original position.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A magnetic suspension system for magnetically suspending a body and comprising a ferromagnetic body magnetically suspended between two magnetic force producing means, one of the magnetic force producing means having a magnetic flux leakage gap, a Hall effect device located in the gap, circuit means connected with the device for applying an exciting current to the device, output circuit means connected with the device for collecting voltages developed by the device by virtue of magnetic flux applied to the device from the magnetic force producing means, the voltages varying in magnitude in accordance with displacements of the body with respect to the magnetic force producing means, control means connected with the output circuit means responsive to the voltages developed by the device and operative to develop control signals indicative of the extent and direction of displacements of the body with respect to the magnetic force producing means, and circuit means on one of the magnetic force producing means connected with the control means and responsive to the control signals so as to develop magnetic forces opposing the displacements of the body to restore the body to its original position.

2. A magnetic suspension system for magnetically suspending a body and comprising a ferromagnetic body magnetically suspended between two coaxially disposed permanent magnets, one of the magnets having a magnetic flux leakage gap, a Hall effect device located in the gap, circuit means connected with the device for applying an exciting current to the device, output circuit means connected with the device for collecting voltages developed by the device by virtue of magnetic flux applied to the device from the magnet, the voltages varying in magnitude in accordance with displacements of the body with respect to the magnet, control means connected with the output circuit means responsive to the voltages developed by the device and operative to develop control signals indicative of the extent and direction of axial displacements of the body with respect to the magnet, and a control coil on the other magnet connected with the control means and responsive to the control signals so as to develop magnetic forces opposing the dispalcements of the body to restore the body to its original position.

3. A magnetic suspension system for magnetically suspending a body and comprising a cylindrical ferromagnetic body magnetically suspended radially of its axis of symmetry between a plurality of pairs of permanent magnets, the magnets of each pair of magnets being diametrically opposite each other with respect to the body, one of the magnets of each pair of magnets having magnetic flux leakage gap, a Hall effect device located in the leakage gap, circuit means connected with the device for applying an exciting current to the device, output circuit means connected with the device for collecting voltages developed by the device due to magnetic flux applied to the device by the magnet, the voltages varying in magnitude in accordance with radial displacements of the body with respect to the magnet, control means connected with the output circuit means responsive to the voltages developed by the device and operative to develop control signals indicative of the extent and direction of the radial displacements of the body with respect to the magnet, and a control coil on one of the magnets of each pair of magnets connected with the control means and responsive to the control signals so as to develop magnetic forces opposing the radial displacements of the body to restore the body to its original position.

4. A magnetic suspension system for magnetically suspending a body and comprising a cylindrical ferromagnetic body magnetically suspended radially of its axis of symmetry between a plurality of pairs of permanent magnets, the magnets of each pair of magnets being diametrically opposite each other with respect to the body, one of the magnets of each pair of magnets having a magnetic flux leakage gap, a Hall effect device located in the leakage gap, circuit means connected with the device for applying an exciting current to the device, circuit means connected with the device for collecting voltages developed by the device due to magnetic flux applied to the device by the magnet, the voltages varying in magnitude in accordance with radial displacements of the body with respect to the magnet, a stabilization coil wound on one of the magnets of each pair of magnets whereby voltages are developed by the coil of polarity and magnitude indicative of the direction and amount, respectively, of the rate of change of radial displacement of the body with respect to the magnet, control means connected with the Hall effect device and the stabilization coil responsive to the voltages developed thereby and operative to develop control signals indicative of the extent and direction of the radial displacements of the body with respect to the magnet, and a control coil on the other magnet of each pair of magnets connected with the control means and responsive to the control signals so as to develop magnetic forces opposing the radial displacements of the body to restore the body to its orignal position.

5. A magnetic suspension system for magnetically suspending a body and comprising a cylindrical ferromagnetic body magnetically suspended radially of its axis of symmetry between two pairs of U-shaped permanent magnets, the magnets being disposed in quadrature about the body, the poles of one of the magnets of each pair of magnets having a magnetic flux leakage gap therebetween, a Hall effect device located in the leakage gap, circuit means connected with the device for applying an exciting current to the device, output circuit means connected with the device for collecting output voltages developed by the device due to magnetic flux applied to the device by the magnet, the output voltages developed by the device varying in magnitude in accordance with radial displacements of the body with respect to the magnet, control means having an input and an output, the output circuit means connecting the device with the input of the control means, circuit means connected with the input for applying a reference voltage to the control means, the control means including voltage comparator means for comparing the reference voltage with the output voltage of the device and operative to develop a control signal voltage in accordance therewith, a stabilization coil wound on the magnet whereby voltages are developed by the coil of polarity and magntude indicative of the direction and amount, respectively, of the rate of change of radial displacement of the body with respect to the magnet, circuit means connecting the stabilization coil with the input of the control means so as to increase the magnitude of the control signal voltage, a control coil on the other magnet of each pair of magnets connected with the output of the control means and responsive to the control signal voltage so as to develop magnetic forces opposing the radial displacements of the body to restore the body to its original position, and damping means on at least one of the magnets of each pair of magnets for minimizing oscillations of the body due to any abrupt changes in magnetic flux in the magnets.

No references cited.